United States Patent [19]
Liu

[11] 3,828,256
[45] Aug. 6, 1974

[54] SELF CONTAINED TEST PROBE EMPLOYING HIGH INPUT IMPEDANCE

[76] Inventor: Ching-Chung Liu, No. 69 Tung Shan St., Hsin Chu, China /Taiwan

[22] Filed: May 13, 1971

[21] Appl. No.: 143,255

[52] U.S. Cl................. 324/133, 324/72, 324/72.5, 324/123 R
[51] Int. Cl...................... G01r 19/16, G01r 31/02
[58] Field of Search ............ 324/72, 72.5, 133, 123, 324/51; 307/304

[56] References Cited
UNITED STATES PATENTS

| 2,942,189 | 6/1960 | Shea et al. | 324/133 |
|---|---|---|---|
| 3,029,383 | 4/1962 | Douglas et al. | 324/133 X |
| 3,258,693 | 6/1966 | Meyer | 324/133 X |
| 3,309,690 | 3/1967 | Moffitt | 324/133 X |
| 3,437,928 | 4/1969 | Baker et al. | 324/133 |
| 3,440,525 | 4/1969 | Cardeiro | 324/123 R X |
| 3,444,465 | 5/1969 | Teixeira | 324/72.5 |
| 3,452,346 | 6/1969 | Kupersmit | 324/72 X |
| 3,482,235 | 12/1969 | Johnson | 324/72 X |
| 3,525,939 | 8/1970 | Cartmell | 324/133 |
| 3,600,678 | 8/1971 | Garrett | 324/133 |
| 3,639,833 | 2/1972 | Tachick | 324/51 |
| 3,711,767 | 1/1973 | Campbell et al. | 324/72.5 X |

OTHER PUBLICATIONS

Fleenor, E. G., Low–Noise Preamplifier Uses Field–Effect Transistors, Electronics April 12, 1963 pp. 67–69.
Gordon, Gary B., IC Logic Checkout Simplified, Hewlett–Packard Journal June 1969 pp. 14–16.

*Primary Examiner*—Gerard R. Strecker
*Attorney, Agent, or Firm*—Moonray Kojima

[57] ABSTRACT

An apparatus for detecting the conduction state of a conductor without touching the conductor with a probe, in which a circuit connected to the probe and operating an indicator means, has a high input impedance in order to readily detect and employ advantageously any stray capacitance between the conductor and the probe.

4 Claims, 10 Drawing Figures

SELF CONTAINED TEST PROBE EMPLOYING HIGH INPUT IMPEDANCE

BACKGROUND

This invention relates to a field induction probing device, more particularly to a probe for detecting the presence or absence of AC voltage, distinguishing "live" wire from "earth" wire and for determining the direction of AC or static electric field, without directly touching the electrical conductor or coverings.

In the prior art an electrical appliance or wire was tested by using electric meters or testing instruments having probes which directly touched the electrical conductor of the appliance or electric wire. Thus it was necessary to open the covers or casing of appliances and machines, or remove the insulating layer or sheath before any tests were made. This is time-consuming and bothersome. For example, to detect an interrupted section inside a long insulating wire, or one failed lamp in a plurality of series connected miniature lamps, it is considered usual that tests are made section by section, or lamp by lamp.

In the prior art, no detecting instrument or device is readily available which can signal a fail portion located inside an insulating wire or electrical appliance without requiring exposure of the conductor.

SUMMARY OF THE INVENTION

Therefore, it is an object of this invention to provide a field induction probing device for detecting the conduction or non-conduction of AC circuits by simply placing a probe adjacent to an electrical appliance or wire to be tested without requiring exposure of the conductor.

The induction of AC or static electric field originally exists in the stray capacitively coupled space. The magnitude of induction is proportionate to the intensity of electric field and the range of frequencies. Ordinarily it is difficult to detect the induction in above-described space due to the low efficiency of induction. Therefore, an appropriate input component matched to enable increasing of the gain of the inducing circuit device is necessary. In this manner, a sufficient level of output signal will be produced through an amplifying circuit.

More specifically, for instance, when two electric wires are positioned parallel to each other with a length of one centimeter and substantially the same diameter, the capacitance therebetween is about one tenth of one MMF (1/10 MMF) its impedance, in response to the frequency of 60 Hz will be about 20000 – 30000 Meg Ohm. Suppose this level is from an object to be tested. The probing or testing instrument itself should be matched with an equivalent input impedance by developing a specific field induction circuit for obtaining a satisfactory result.

To overcome above-mentioned problems, a circuit of extremely high resultant input impedance has been developed by the present invention. In accordance with the present invention, the field induction probing device comprises a circuit device with an extremely high resultant input impedance including an inducing probe completely insulated from any other portion and an output visual indicator.

The foregoing and other objects, features and advantages of this invention will be apparent from the following detailed description of certain preferred embodiments of this invention with reference to the accompanying drawing.

DESCRIPTION OF THE PREFERRED EMBODIMENTS

Figure 1:
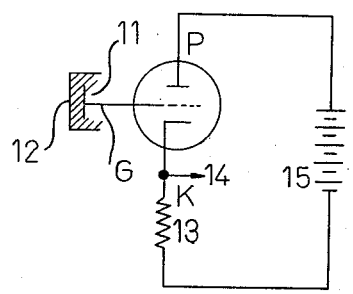
FIG. 1 depicts one embodiment of the invention employing the principle of the field induction probing and having a vacuum tube circuit.
Figure 2:
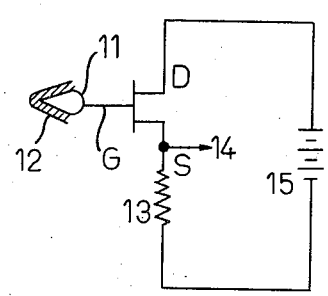
FIG. 2 depicts another embodiment of this invention, in which the active element is a semi-conductor device.
Figure 3:
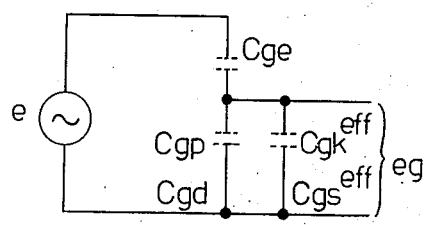
FIG. 3 depicts an equivalent circuit diagram of the embodiments of FIGS. 1 and 2 and illustrating the common relationship therebetween.

Referring now to FIGS. 1 through 3, there are depicted an inducing probe 11, a shell 12 which is completely insulated from any other portion, an output load resistor 13, an output terminal 14, and a power supply 15. The circuit, as shown in FIG. 1 is a modified circuit developed from a cathode follower circuit. According to the present invention, it is necessary to obtain an extremely high resultant input impedance. Thus, the inducing probe 11 is connected to the grid G of the electron tube 100. In this manner, the suitable bias is automatically maintained only by the space charge inside the vacuum tube. Under this arrangement, the requirement for a circuit with an extremely high resultant input impedance is satisfied.

Although grid G of tube 100, in FIG. 1, does not have a complete circuit, using appropriate plate voltage, current can be obtained with a balancing grid potential above its cut-off point. In this situation, upon moving inducing probe 11 adjacent to the AC or static electric field, the plate current is thereby modulated by the signal induced at the grid, and an AC output voltage is developed from the cathode of the tube 100. With the effect of feedback, the amplitude of the voltage wave is smaller than that of the signal induced at the grid and substantially no noise amplification occurs. Thus, this circuit is particularly useful for actuating the visual indication of the output circuit of the field induction probing device in accordance with the principles of this invention.

It will be noted that the magnitude of the signal induced at the grid and inducing probe is determined by the divided voltage of the coupling capacitance between the inducing probe and the object to be tested and is in proportion to the sum of capacitance between the grid and the cathode, the grid and the plate or its equivalent value. Referring to FIG. 3, the values of equivalent circuit are defined as $$eg \cong e\, Cge/(Cge + Cgp + Cgkeff)$$

where $eg$ is a signal voltage induced at the grid, $e$ is the sum of voltage of induction electric field, $Cge$ is a coupling capacitance between the signal source of electric field and inducing electric probe, $Cge$ is capacitance between the plate and the grid and $Cgkeff$ is an effective value of capacitance between the grid and the cathode which is reduced by the effect of feedback. It will be appreciated that the component of DC resistance is negligible, because the connection of the grid according to this invention is completely insulated from any other portion, and hence the phase of output signal from the cathode is kept substantially the same as the original.

FIG. 2 depicts another principle illustrative circuit diagram of the field induction probing device of this invention, whose over all structure is similar to that of FIG. 1 except the active element is a semiconductor device, such as a field effect transistor. This type of transistor has the unique character of high input and output impedance and low leakage gate. The input impedance of such transistor may be 20,000 to 30,000 megohms. Accordingly such a circuit is particularly advantageous for use in the field induction probing circuit of this invention.

As soon as the circuit, shown in FIG. 2, is energized, current flows through output load resistor 13 connected between the sources and the drain D. In a similar manner, the gate terminal G and inducing probe 11 being completely insulated with other portions, the potential of the gate is maintained in balance within a prescribed value by the leakage charge of distributed resistance existing interposed between regions of said terminals (of source, gate and drain). Thus, in the event the inducing probe 11 is placed near an AC electric field, a signal is immediately developed at the gate and the output current of the field effect transistor is thereby modulated. This arrangement is a source follower circuit, similar to a cathode follower circuit, with an input potential relationship and having feedback of capacitive divided voltage as described above in connection with FIG. 3.

Figure 4:
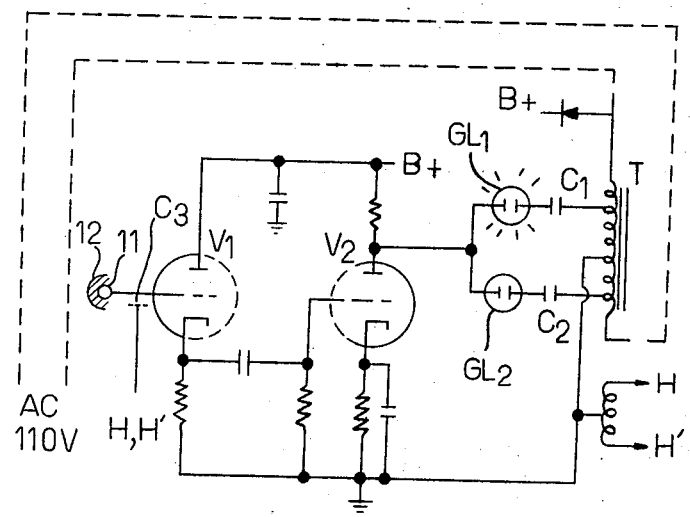
FIG. 4 depicts an illustrative circuit diagram of one embodiment of this invention.

Referring now to FIG. 4, there is shown one embodiment of field induction probing circuit device in accordance with this invention. The tube $V_1$, serves as a cathode follower output stage as previously described. Its grid is directly connected to inducing probe 11 in which the front portion is completely insulated. The tube $V_2$ serves as a power amplifier output stage. The two gas discharge lamps $GL_1$ and $GL_2$ are connected in parallel with the plate output circuit of the tube $V_2$ and connected through capacitors $C_1$ and $C_2$ to two suitably tapped windings of power transformer T, respectively. The center tapped winding of transformer T is connected to the negative terminal of a B power supply B. The gas lamps are dimmed under the condition of no AC voltage output from the tube $V_2$. Likewise, if the inducing probe 11, which may be held adjacent to an AC circuit or electric appliance which is to be tested, one of the gas lamps will be caused to glow to indicate the polarity or direction of the AC electric field. It is to be noted that the AC source applied to the field induction probing device of this embodiment should be in phase with that applied to the electric field or appliance, so as to enable the gas lamps to glow or to dim by addition or subtraction in phase voltage which is output from the tube $V_2$ and which is originally applied across the terminals of gas lamp. For example, in the event the inducing probe 11 is placed adjacent to the electric field of an AC "live" wire, the gas lamp $GL_1$ connected to the "live" terminal of the transformer will be lit since the voltage applied to the lamp is increased by the addition of the above-mentioned in phase voltages and lamp $GL_2$ caused to extinguish. On the other hand, if the inducing probe 11 is placed adjacent to the electric field of an AC "earth" wire, the gas lamp $GL_2$ connected to the "earth" terminal of the transformer will be lit, and the gas lamp $GL_1$ caused to extinguish. In this embodiment, the grid signal being affected by the AC source of filament of the tube should be reduced to a minimum. Thus, it is necessary to provide a balancing small capacitor $C_3$ between the inducing probe 111 and the grid. This requirement is eliminated if a DC power supply applying power to the filament.

Figure 5:
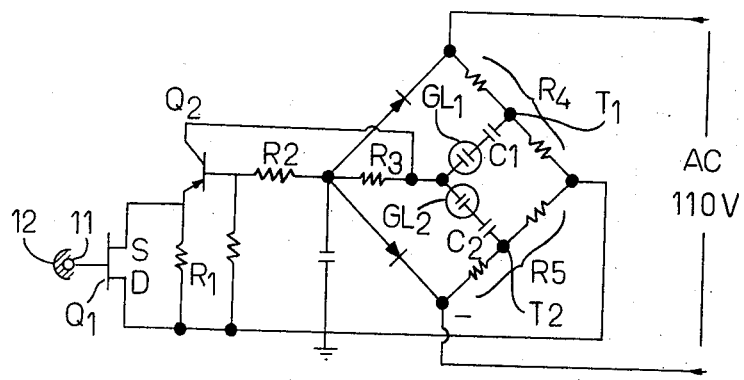
FIG. 5 depicts an illustrative circuit diagram of another embodiment of this invention.

Another preferable embodiment of this invention is depicted in FIG. 5. The active element in this circuit is a field effect transistor $Q_1$ serving as field inducing stage, and is connected in source follower cicuit configuration. Transistor $Q_2$ is an output stage. The gate terminal of transistor $Q_1$ is connected to inducing probe 11. A resistor $R_1$ is connected the terminal of the drain and a source. One terminal of resistor $R_1$ is further connected to the emitter of transistor $Q_2$ so as to combine transistors $Q_1$ and $Q_2$ together to form a series amplifying stage. Therefore, amplified AC signal is developed from the collector of transistor $Q_2$. The collector of transistor $Q_2$ is also connected to a pair of gas discharge lamps $GL_1$ and $GL_2$ (which are similar to those of the embodiment of FIG. 4) through the resistor $R_2$ and $R_3$. The gas lamps $GL_1$ and $GL_2$ are in turn connected to appropriate taps $T_1$ and $T_2$ of divided resistor $R_4$ and $R_5$ of an AC power supply through capacitor $C_1$ and $C_2$. Advantageously, no signal in this circuit can be affected by the AC supply of the filament, and the polarity of an input inducing signal is coincident with that of an output signal at the transistor $Q_2$. Thus, if an electric field of a "live" wire is probed, the gas lamp connected to the "earth" terminal will obtain an additional voltage as a result of the two in-phase voltages and will be lit to indicate the nature of the probed object. On the other hand, if the electric field is that of the "earth" wire, the gas lamp connected to the "live" terminal of AC supply divider will, similarly, be lit.

The further preferable embodiment of this invention may employ a type of single-lamp indication such as an incandescent lamp 13. In this way, the brightness of indicating lamp 13 is much improved and the arrangement of the circuit is simplified.

Figure 6B:
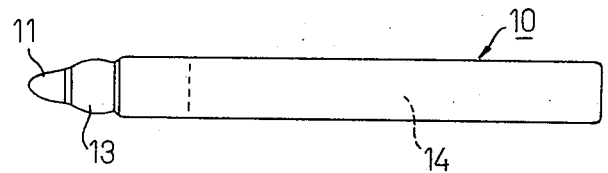
FIG. 6B depicts an elevation view of the device illustrated in FIG. 6A.
Figure 6A:
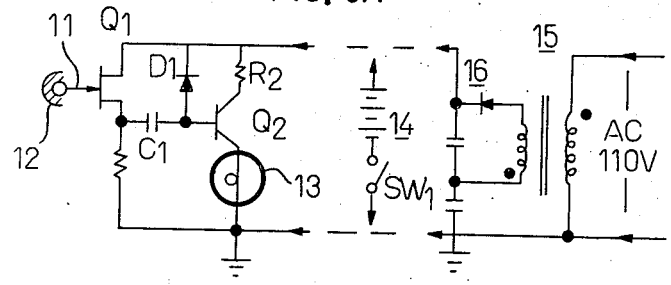
FIG. 6A depicts an illustrative circuit diagram of a further embodiment of this invention comprising two types of power supplies and a single lamp for showing a visual indication.

As shown in FIG. 6A, the field induction probing stage also employs a field effect transistor $Q_1$ as previously described. The output stage is provided with a class B amplifying transistor $Q_2$ to actuate lamp 13. As the inducing probe 11 is placed adjacent to an electric field of "live" wire, an AC output signal is developed from the source of the transistor $Q_1$, then is in turn coupled to the base of transistor $Q_2$ through capacitor $C_1$.

Output current flows through the path of diode $D_1$ during the positive half cycle of the signal, while it flows from the base of the transistor $Q_2$ to the emitter resistor $R_2$ during the negative half cycle of the signal, whereupon the transistor $Q_2$ is biased into conduction so as to enable the collector current of the transistor $Q_2$ to energize lamp 13. Lamp 13 will, hence, be lit to indicate the nature of the electric field. It will be appreciated that a DC power supply may be substituted by the commercial AC supply associated with a rectifying device comprising a step-down transformer 15 and diode 16, as shown in FIG. 6A. In such a case, of course, the polarity of this circuit should be correctly checked before using.

FIG. 6B depicts a pictorial embodiment of this invention using a portable mini flash-light comprising an inducing probe 11, indicating lamp 13, and two units of dry cell batteries 14, enclosed inside casing 10.

Figure 7B:
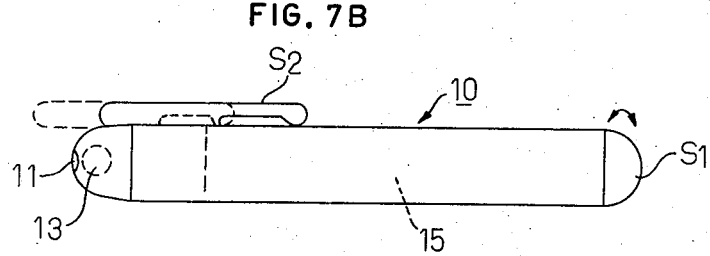
FIG. 7B depicts an elevation view of the device illustrated in FIG. 7A showing a field induction probing lamp associated with a portable pen shaped flash-light.
Figure 7A:
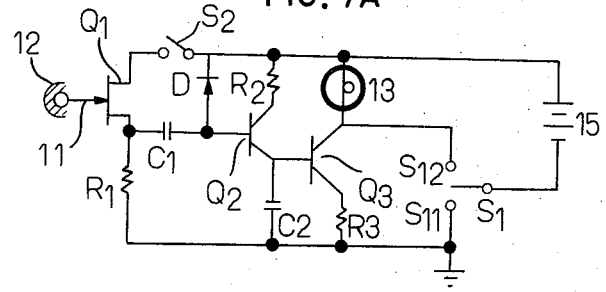
FIG. 7A depicts an illustrative circuit diagram of a still further embodiment of this invention.

A still further preferable embodiment of the present invention is depicted in FIGS. 7A and 7B, and also is adapted for use in portable pen shaped flash-light in addition to the field induction probing lamp. It will be seen that the power supply can be a dry cell battery or any other type of DC supply. The appearance of this type of unit, similar to a portable miniature flash-light with a size of a standard fountain pen, is preferable.

According to this embodiment, as shown in FIGS. 7A and 7B, transistor $Q_1$ serves as a field inducing device as previously described. In addition, switch $S_2$ is connected between the drain of transistor $Q_1$ and the common positive terminal of a DC supply 15. Another switch $S_1$ comprising contacts $S_{12}$ and $S_{11}$ enable selective use of the battery for the flash-light and the field induction probing lamp, respectively.

In operation, with the switch $S_2$ switched "on" and the switch $S_1$ switched to the contact $S_{11}$, if the inducing probe 11 is positioned adjacent to an AC electric field, the output signal of the transistor $Q_1$ is coupled to the base of the transistor $Q_2$ through the capacitor $C_1$. The transistor $Q_2$ is biased and brought into conduction state. A pulse current is thereby developed from the collector of transistor $Q_2$. Since the collector of transistor $Q_2$ is directly coupled to the base of the transistor $Q_3$, between which one terminal of filter capacitor $C_2$ is connected, while the other terminal of said capacitor $C_2$ is grounded, a sufficiently large amount of base current of transistor $Q_3$ will cause transistor $Q_3$ in heavy conduction to enable lamp 13 to be lit for a visual indication.

On the other hand, if this device is to serve as a flash-light, the switch $S_2$ is switched "OFF," and the switch $S_1$ is switched on the contact $S_{12}$, whereupon the lamp 13 is energized. If no operation is required in this device, the switch $S_1$ is preferable switched to the middle position as shown in FIG. 7A.

The appearance of this device is shown in FIG. 7B. As shown, the elements of this device are all compactly enclosed inside casing 10 which is similar to the casing of an ordinary fountain pen. A clip serves as both holder and switch $S_2$. The other end of casing 10 is provided with a selective switch $S_1$ for selecting use of the flash-light or field induction probing device.

Figure 8:
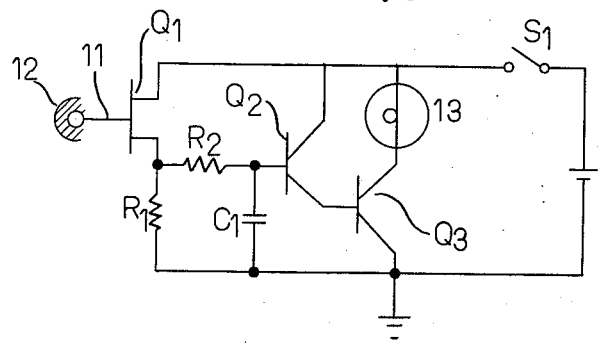
FIG. 8 depicts an illustrative circuit diagram of a still further embodiment of this invention in which the power supply is a single dry cell unit.

Turning now to FIG. 8, there is shown a still further embodiment of this invention which is modified from the operation principle of previously described embodiment. The circuit diagram is similar to the above-mentioned circuit. For the purpose of the portable size adapted for convenient carrying, the DC supply is provided with one unit of dry cell battery and the switching means is simplified and the diode $D_1$ is therefore omitted. The arrangement of circuit elements is slightly altered. When inducing probe 11 is placed adjacent to an AC electric field, transistor $Q_1$ is energized. The output signal of transistor $Q_1$ is applied to the base of the transistor $Q_2$ upon filtering by resistor $R_2$ and capacitor $C_1$. Due to the collector of transistor $Q_2$ being directly coupled to the base of the transistor $Q_3$ and the emitter of the transistor $Q_3$ being directly grounded, transistor $Q_2$ may supply a sufficiently large amount of base current to transistor $Q_3$ accordingly. In this manner, the transistor $Q_3$ is energized in a heavy conduction state, and a large amount of current is supplied to lamp 13 to cause it to be lit for visual indication.

Although the present invention has been described with reference to a certain particular embodiment, it is to be understood that these embodiments are only illustrative of the application of the principles of the invention. It will be understood by those skilled in the art that the field induction probing device shown herein may be used in the performance of various probing function without departing from the spirit and scope of this invention.

What is claimed is:

1. A self contained, portable hand holdable apparatus for testing the conducting state of a conductor without requirement of direct contact, comprising
   1. fountain pen sized container means of a hollow elongated tube like means having two ends and wherein are hermetically sealed the following components:
   2. probe means located towards one end of said two ends of said container and having an electrode portion and an insulator portion covering said electrode portion;
   3. indicator means located toward said one end in close physical proximity to said electrode of said probe means and insulated therefrom;
   4. circuit means containable in said container means and comprising a field effect transistor having a gate input electrode, a drain electrode and a source output electrode, said field effect transistor being connected in source follower circuit configuration and having an input impedance of 20,000 to 30,000 megohms, provided by the space charge of said field effect transistor without any added biasing means, said gate input electrode being directly connected to said electrode of said probe means and having no other circuit connections thereto, at least one amplifier transistor means having an input electrode connected to the source output electrode of said field effect transistor and an output electrode connected to said indicator means, and means for biasing said field effect transistor and said amplifier transistor means, whereby said apparatus can be readily picked up and moved by the fingers of a hand with said probe means placed in the vicinity of an electrostatic field emanating from a low voltage energized conductor to cause said field effect transistor to cutoff and in turn cause said amplifier transistor means to conduct and hence cause flow of current to said indicator means whereby high sensitivity is attained.

2. Apparatus of claim 1, wherein said container means comprises a first part wherein are located said probe means, said indicator means and said circuit means, and a second part wherein are located a battery means for biasing said circuit means and a switch means.

3. Apparatus of claim 1, wherein said biasing means comprises at least one dry cell battery.

4. Apparatus of claim 3, wherein said indicating means comprises an incadescent lamp.

* * * * *